United States Patent [19]
Atwood

[11] 3,862,818
[45] Jan. 28, 1975

[54] MANDREL FOR SHAPING BAKERY PRODUCTS

[76] Inventor: Harold T. Atwood, 14152 Irving Ave., Dolton, Ill. 60619

[22] Filed: Mar. 18, 1974

[21] Appl. No.: 452,428

[52] U.S. Cl............. 425/308, 425/403, 425/364 B
[51] Int. Cl.............................................. A21c 11/00
[58] Field of Search........ 425/403, 364 B, 470, 296, 425/302, 308

[56] References Cited
UNITED STATES PATENTS

| | | | |
|---|---|---|---|
| 1,552,430 | 9/1925 | Gendler | 425/364 B |
| 2,628,578 | 2/1953 | Roth | 425/364 B |
| 3,491,704 | 1/1970 | Thompson | 425/364 B X |

Primary Examiner—Francis S. Husar
Assistant Examiner—David S. Safran
Attorney, Agent, or Firm—Benjamin Schlosser

[57] ABSTRACT

A mandrel, adjustably mounted on a base and adapted to cooperate with a conveyor belt to form a strip of dough into torus shape, is provided with a plurality of longitudinal extending fins projecting outwardly from the rear end portion of the mandrel. The fins cut partially through the dough from the inside circumference of the torus. The mandrel may be provided with another fin, slightly wider than the first mentioned fins, to cut through the dough completely along one radius and cause the dough to assume the shape of a long roll as it falls from the rear end of the mandrel.

1 Claim, 4 Drawing Figures

PATENTED JAN 28 1975   3,862,818
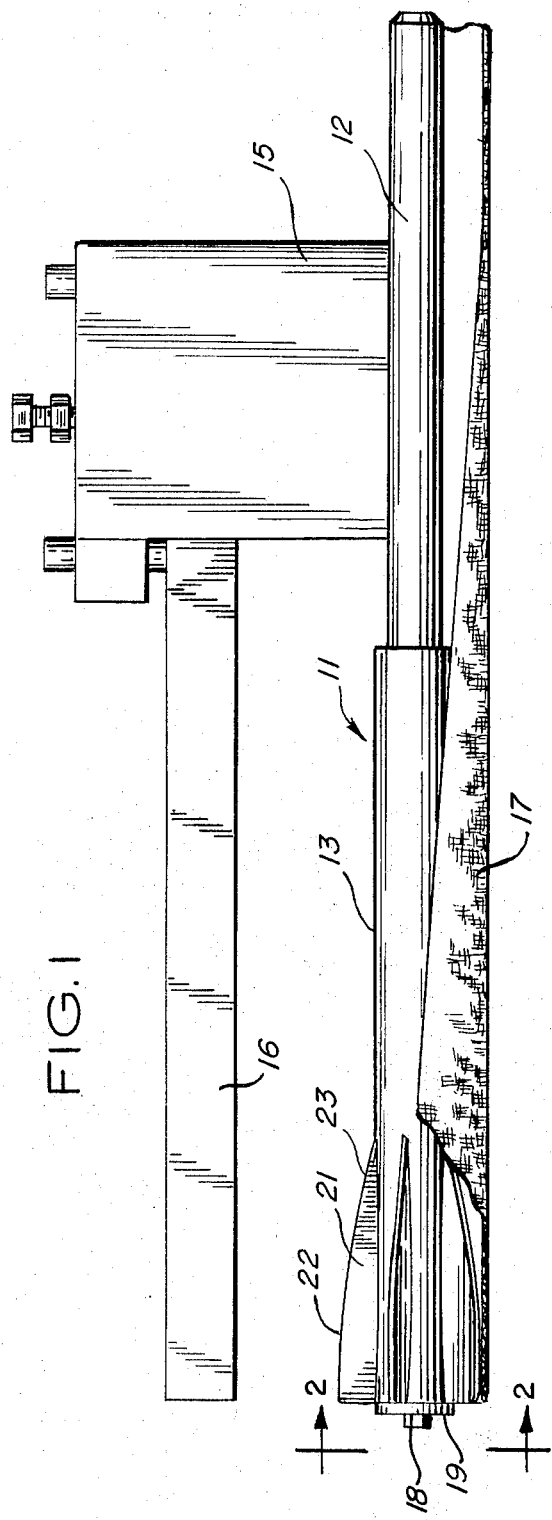
FIG. 1
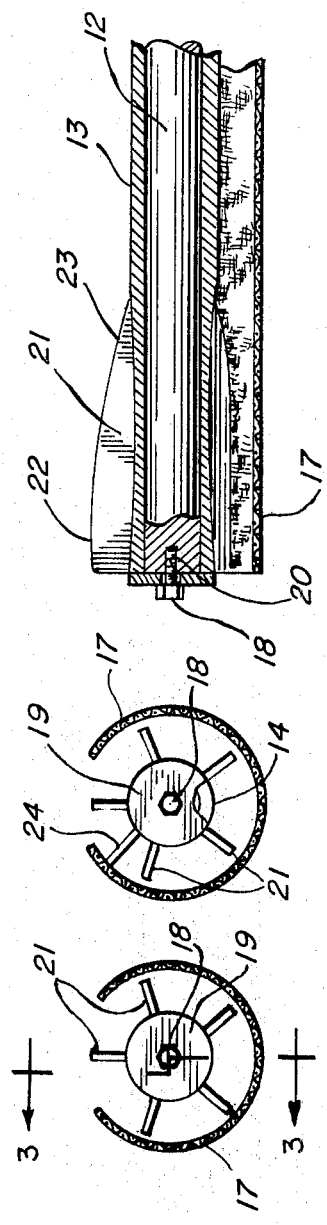
FIG. 2   FIG. 4
FIG. 3

MANDREL FOR SHAPING BAKERY PRODUCTS

BACKGROUND OF THE INVENTION

1. Field of the Invention

The present invention is concerned with apparatus comprising simple mechanical parts that may be readily interchanged to shape pieces of dough into various commercially desirable shapes that may later be baked or cooked into bagels, bialys, kaiser rolls, long rolls, bread sticks, or various other bakery products.

2. Description of the Prior Art

The only prior art, as far as applicant is aware, comprises bagel making machines as exemplified by the U.S. Pat. No. 3,407,754, issued Oct. 29, 1968, to Louis Wichinsky. All machines of this type have heretofore been limited strictly to the production of bagels.

SUMMARY OF THE INVENTION

This invention relates to readily interchangeable mandrel means that may be adjustably secured to a support on a bagel making machine for shaping pieces of dough into commercially desired shapes for making various kinds of rolls or other bakery products.

BRIEF DESCRIPTION OF THE DRAWINGS

FIG. 1 is an elevational view of a two-part mandrel secured to a support member;

FIG. 2 is an end elevational view of the rear end of the mandrel, as indicated by the line 2—2 of FIG. 1;

FIG. 3 is a longitudinal sectional view, taken in the plane indicated by the one 3—3, of FIG. 2; and FIG. 4 is a view, similar to FIG. 2, showing a modified form of the mandrel.

DESCRIPTION OF THE PREFERRED EMBODIMENTS

The mandrel 11 comprises a solid cylindrical secion 12 and a tubular section 13 or 14 adapted to slide axially on the rear end portion of the section 12. A flat plate 15 rigidly secured to the section 12 and extending longitudinally thereof is adjustably secured to a support member 16 in any suitable manner. The support member 16 may be an integral part of the frame of a bagel making machine, or may be rigidly secured thereto. The rear edge of the flat plate 15 is located on the section 12 forwardly of the position at which the opposite ends of each strip of dough, bent around the circumference of the mandrel by a conveyor belt 17, are jointed together to form the torus shape before the dough reaches the rear end of the mandrel.

The tubular sections 13 and 14 are interchangeable, and either may be secured to the section 12 by a screw 18 that passes through a plate 19 covering one end of the section 13 or 14 and threads into a threaded opening 20 in the rear end of section 12. The screw 18 and plate 19 permit selective securement and removal of interchangeable tubular sections 13 or 14 to the rear end portion of the section 12 for shaping pieces of dough differently for subsequent baking into various bakery products.

The tubular section 13, shown in FIG. 3, has a plurality of longitudinally extending fins 21 projecting outwardly from the rear end portion of the section. The fins 21 are preferably tapered from their widest portion 22, adjacent the rear end portion of the tubular section 13, as indicated at 23, to merge with the outer peripheral surface of the tubular section. The circumference described by the outermost edges of the fins 21 is slightly less than the inner circumference of the conveyor belt 17 that guides each strip of dough into torus shape as it moves successive strips of dough toward the rear end of the mandrel.

As each torus shaped piece of dough is moved into engagement with the fins 21, each of the fins slits the dough from the inner circumferential surface of the torus. The fins do not cut completely through the dough because of the spatial relationship between the outer edges of the fins and the inner surface of the conveyor belt 17. The conveyor belt turns the torus shaped dough to impart an axial rotational movement to the torus shaped dough as it is moved longitudinally along the mandrel toward the rear end of the mandrel where it is discharged. The mandrel section 13 may be so located, relative to the length of the mandrel section 12, as To discharge the torus shaped dough from the rear end of the mandrel with the slits on either the inner or the outer circumference of the torus.

In the embodiment of the invention illustrated in FIG. 4, the mandrel section 14 differs from the mandrel section 13 in that it has an additional fin 24 located between two of the fins 21. The fin 24 is tapered in the same manner as the fins 21, but its widest portion is wider than the corresponding portion of the fins 21, and the circumference defined by the outer edge of the fin 24 is coincident with the inner surface of the conveyor belt. The fin 24 completely severs the torus shaped piece of dough as the dough approaches the rear end of the mandrel. The dough is discharged from the rear end of the mandrel in the form of a strip which may be baked into an elongated roll, horn, or salt stick.

I claim:

1. An apparatus for shaping bakery products comprising a mandrel having a solid section and a tubular section detachably secured to said solid section, said tubular section having a plurality of longitudinally extending fins projecting outwardly from its circumferential surface to engage torus shaped pieces of dough moved longitudinally of the mandrel whereby said fins cut partially through said torus shaped pieces of dough from the inner circumferential surface of said torus, a conveyor belt substantially embracing said mandrel to impart a rotational axial movement to said pieces of dough as it moves them longitudinally along said mandrel, and said tubular section being so located, relative to said solid section, as to discharge said pieces of dough with the slits positioned on the outer circumferential surface of said pieces of dough.

* * * * *